United States Patent
Lin et al.

(10) Patent No.: US 7,054,639 B2
(45) Date of Patent: May 30, 2006

(54) METHOD AND APPARATUS FOR DETERMINING DATA TRANSMIT DIVERSITY MODE OF BASE STATION

(75) Inventors: Che-Li Lin, Taipei (TW); Sheng-Jie Chen, Taoyuan (TW)

(73) Assignee: BenQ Corporation (TW)

( * ) Notice: Subject to any disclaimer, the term of this patent is extended or adjusted under 35 U.S.C. 154(b) by 166 days.

(21) Appl. No.: 10/721,224

(22) Filed: Nov. 26, 2003

(65) Prior Publication Data

US 2004/0147234 A1 Jul. 29, 2004

(30) Foreign Application Priority Data

Dec. 2, 2002 (TW) ................................ 91134914 A

(51) Int. Cl.
*H04Q 7/20* (2006.01)

(52) U.S. Cl. .................. 455/452; 455/67.11; 455/101; 375/299

(58) Field of Classification Search ................ 455/452, 455/101, 67.11, 272; 370/252; 375/299
See application file for complete search history.

(56) References Cited

U.S. PATENT DOCUMENTS

| | | | |
|---|---|---|---|
| 6,584,161 B1 * | 6/2003 | Hottinen et al. ............ 375/299 |
| 6,839,326 B1 * | 1/2005 | Pajukoski et al. .......... 370/252 |
| 6,892,059 B1 * | 5/2005 | Kim et al. .................. 455/272 |
| 2003/0003873 A1 * | 1/2003 | Raghothaman ............ 455/67.1 |

* cited by examiner

Primary Examiner—Erika A. Gary
(74) Attorney, Agent, or Firm—Michael Bednarek; Pillsbury Winthrop Shaw Pittman LLP

(57) ABSTRACT

The present invention provides a method and apparatus for determining the data transmit diversity mode of a base station. The present invention first estimates a first feedback weight of the mobile unit during a first slot. The first feedback weight has a first phase. Then, the present invention estimates a second feedback weight of the mobile unit during a second slot. The feedback weight has a second phase. A phase difference is obtained by comparing the first phase with the second phase. The present invention determines the applicability of closed loop transmit diversity mode according to the phase difference. Besides, if the feedback error rate is too high, the present invention commands the base station to tune off the closed loop transmit diversity for better performance.

14 Claims, 6 Drawing Sheets

METHOD AND APPARATUS FOR DETERMINING DATA TRANSMIT DIVERSITY MODE OF BASE STATION

CROSS REFERENCE TO RELATED APPLICATIONS

This Application claims priority to Taiwan Patent Application No. 091134914 entitled "Method and Apparatus for Determining Data Transmit Diversity Mode of Base Station", filed Dec. 2, 2002.

FIELD OF THE INVENTION

The present invention relates to a method and an apparatus for determining data transmission mode of base station in wireless communication system, and more particularly, to a method and an apparatus for a mobile unit determining the data downlink transmit diversity mode of base station.

BACKGROUND OF THE INVENTION

In recent years, the spread spectrum communication systems are more and more important in digital cellular and personal communication networks. In particular, direct sequence code division multiple access (DS/CDMA) has been adopted in third generation cellular standard.

Improvement of downlink capacity is one of the main challenges for 3G evolution. Transmit diversity provides an attractive avenue for increasing the downlink capacity problem. In order to reduce the interference of downlink transmission to send the better signal to the base station, the transmit diversity technique uses a plurality of orthogonal antennas to send different modulated signals of one message.

The transmit diversity technique can be generally classified as open loop transmit diversity and closed loop transmit diversity. The open loop transmit diversity employs the space time block coding and the full diversity of a plurality of antennas. The distances between antennas should be large enough so that the signal fading received by different antennas can be viewed as independent and the antenna power can be increased. The closed loop transmit diversity mode has tow sub-modes, which use downlink channel measurements and feedback signaling in controlling the phases and/or gain transmit weights in the two transmit antennas.

However, the closed loop transmit diversity is typically applied to a low moving speed environment. In a high moving speed environment (above 40 or 50 km/hour), the variation of the signal is too fast. The fast variation causes signal fading and inaccuracy of channel estimating which decays the system efficiency.

SUMMARY OF THE INVENTION

The present invention improves the system performance by determining the applicability of transmit diversity of a base station in a wireless communication system, e.g. CDMA communications system. By observing the changes of the pilot symbol of the dedicated physical channel and the channel signal of the common pilot channel, the present invention obtains the variation of the channel signal. The present invention further commands the base station to disable the closed loop transmit diversity mode when the variation of the channel signal is too fast or the feedback error rate is too high.

The present invention provides a method for a mobile unit to determine a data transmit diversity mode of a base station in a wireless communication system. First, a first channel feedback weight having a first feedback phase of the mobile unit during the previous slot is estimated. A second channel feedback weight having a second feedback phase of the mobile unit during the current slot is estimated. The present invention then determines the data transmit diversity mode of the base station according to calculating the first channel feedback weight and the second channel feedback phase.

The present invention provides another method for a mobile unit to determine a data transmit diversity mode of a base station in a wireless communication system by FBI (Feedback Information) error. A tune weight of the mobile unit corresponding to a signal received from the base station during a slot is calculated. The tune weight has a tune phase. A feedback channel weight of the mobile unit during the slot is estimated. The feedback weight has a feedback phase. The present invention then determines the data transmit diversity mode of the base station according to the phase difference between the tune weight and the feedback weight.

The present invention also provides an apparatus for a mobile unit to determine a data transmit diversity mode of a base station in a wireless communication system. The apparatus includes an estimating unit and a determining unit. The estimating unit estimates a first channel feedback weight having a first feedback phase of the mobile unit during the previous slot and a second feedback channel weight having a second feedback phase of the mobile unit during the current slot. The determining unit determines the data transmit diversity mode of the base station according to the first feedback phase and the second feedback phase.

The present invention provides another apparatus for a mobile unit to determine a data transmit diversity mode of a base station in a wireless communication system. The apparatus includes a calculating unit, an estimating unit and a determining unit. The calculating unit calculates a tune weight of the mobile unit corresponding to a signal received from the base station during a slot. The tune weight has a tune phase. The estimating unit estimates a feedback weight of the mobile unit during the slot. The feedback weight has a feedback phase. The determining unit determines the data transmit diversity mode of the base station according to the tune weight and the feedback weight.

DETAILED DESCRIPTION OF THE INVENTION

The present invention provides a method and an apparatus for a mobile unit to determine the data transmit diversity mode of the mobile unit by estimating the downlink data signal from the base station and feeding back a weight signal to the base station.

Figure 1:
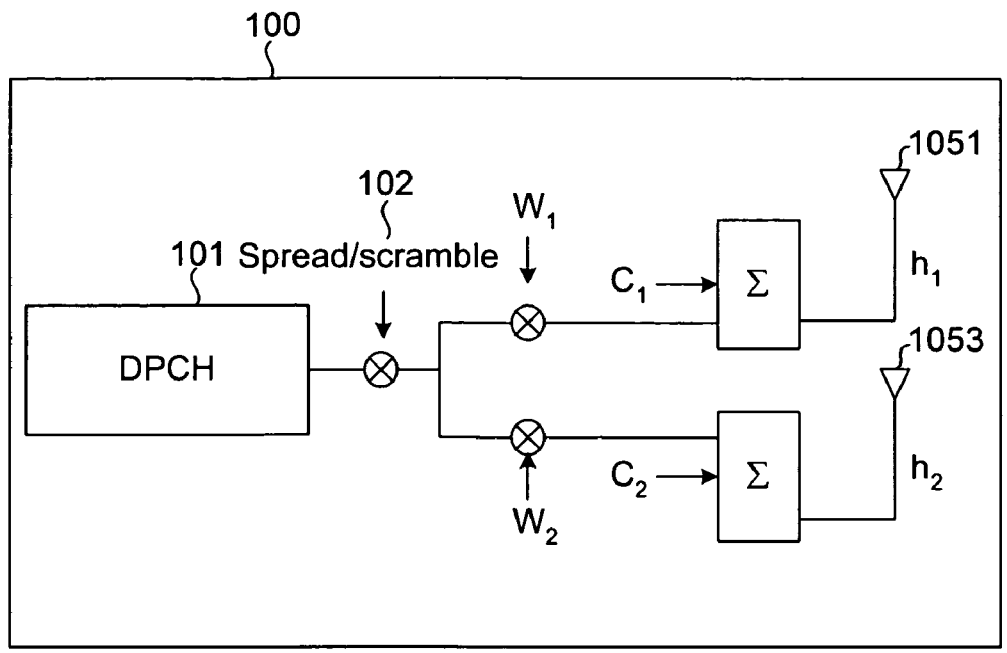
FIG. 1 shows a block diagram of transmit diversity closed loop system.
Figure 1:
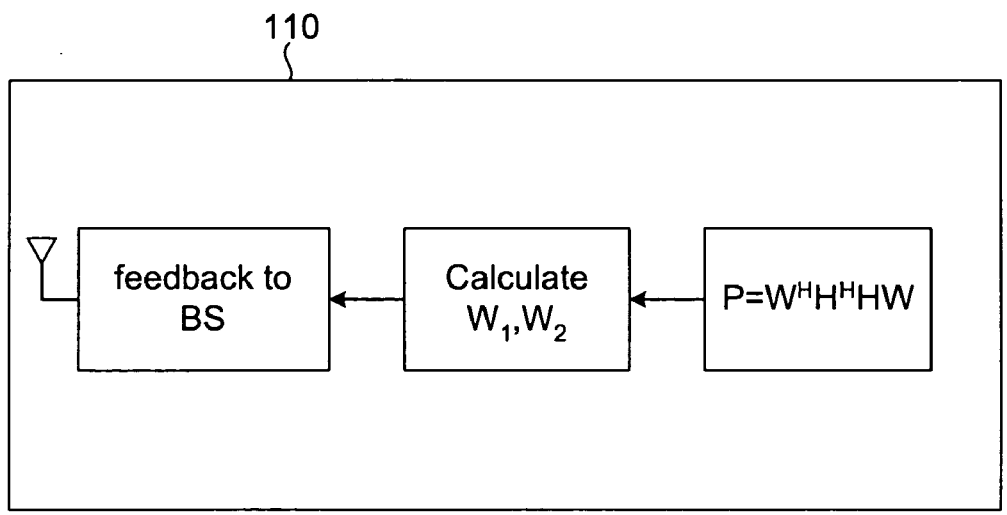

FIG. 1 shows a block diagram of transmit diversity closed loop system. After weighted with a spread/scramble code 102, the signal of dedicated physical channel 101 of the base station 100 is weighted with antenna specific weight factors $W_1$ and $W_2$, $W_1$ and $W_2$ can be tune weight. The feedback weight factor parameters form weight vectors which are complex valued signals, in general. The base station then adds a first common pilot channel $C_1$ and a second common pilot channel $C_2$ to the weighted signals and send those signals to the mobile unit via antenna 1051 and 1053. The channel feedback weight vectors, $W_1$ and $W_2$, which corresponding the phase/power adjustments of the base station 100 are determined by the mobile unit 110. The target is to find a transmit weights that maximize the signal-to noise ratio when the base station transmitting the downlink signal.

The computation of feedback information can be accomplished by solving for weight vector w, that maximizes $$P = w^H H^H H w$$

where $H=[h_1, h_2]$, and $w=[w_1, w_2]^T$, The vectors $h_1$ and $h_2$ represent the channel impulse responses for the transmission antennas 1051 and 1053. After $h_1$ and $h_2$ are estimated, an eigenvalue of the channel autocorrelation matrix $R=H^H H$ is obtained. The optimum transmit weights are the eigenvector $w_f(n)=[w_1, w_2]$ corresponding to the maximum eigenvalue of the channel autocorrelation matrix $R=H^H H$. The mobile unit 110 then sends the $[w_1, w_2]$ to the base station 100 for adjusting the phase/power of antennas.

Figure 2:
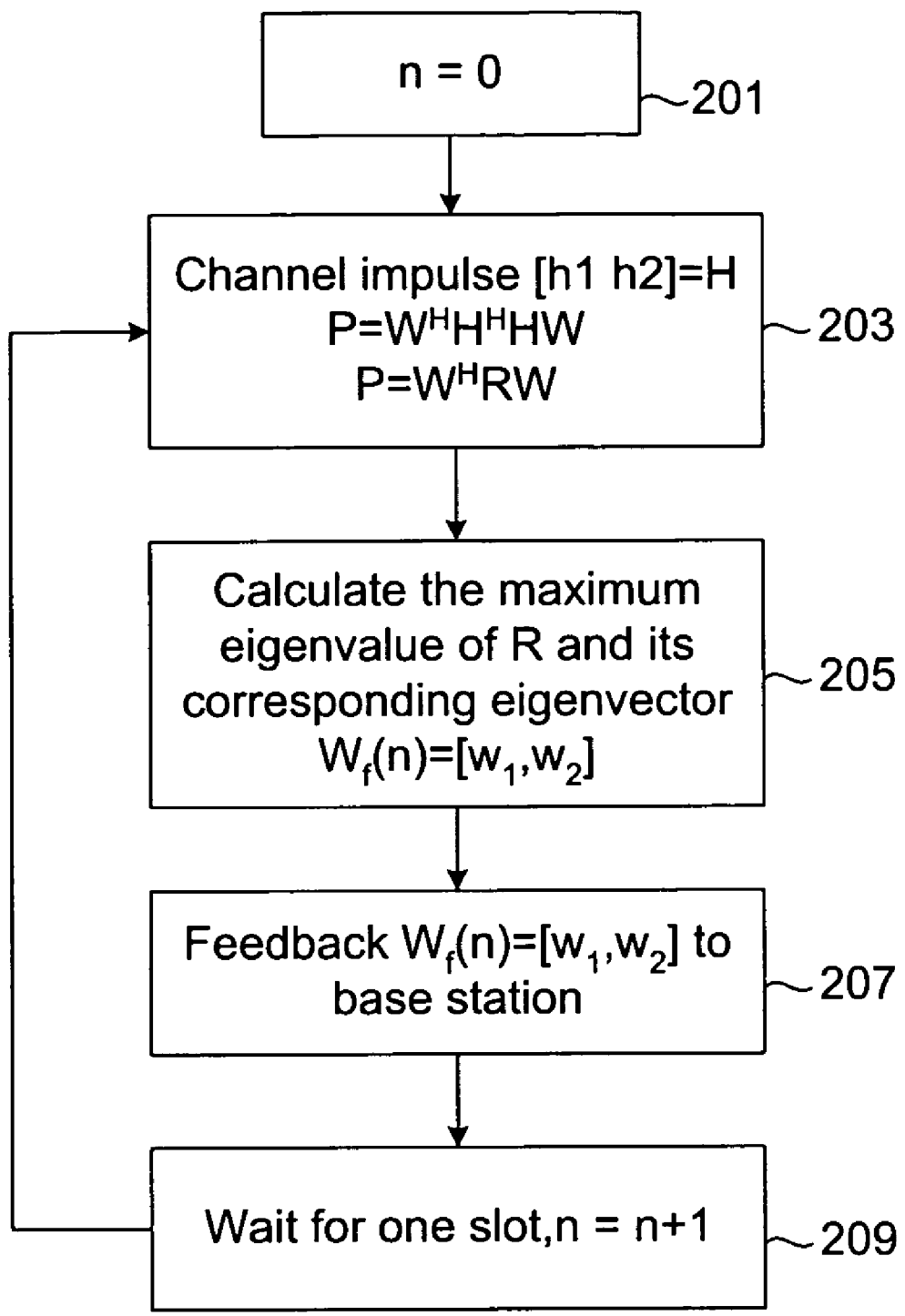
FIG. 2 shows a flowchart of a method of calculating feedback weight parameter.

FIG. 2 shows a flowchart of a method of calculating feedback weight parameter. First, a slot n is initialed 0 in step 201. P is calculated in step 203. The maximum eigenvelue of R and the corresponding eigenvector $w_f(n)=[w_1, w_2]$ are calculated in step 205. The eigenvector $w_f(n)=[w_1, w_2]$ is fed back to the base station in step 207. Lastly, n becomes n+1 after waiting for one slot in step 209.

Since the eigenvector is periodically fed back and is affected by the signal fading delay in high moving speed environment, the closed loop transmit diversity may decrease the system efficiency. The present invention provides a method for determining the data transmit diversity mode of the base station.

Figure 3:
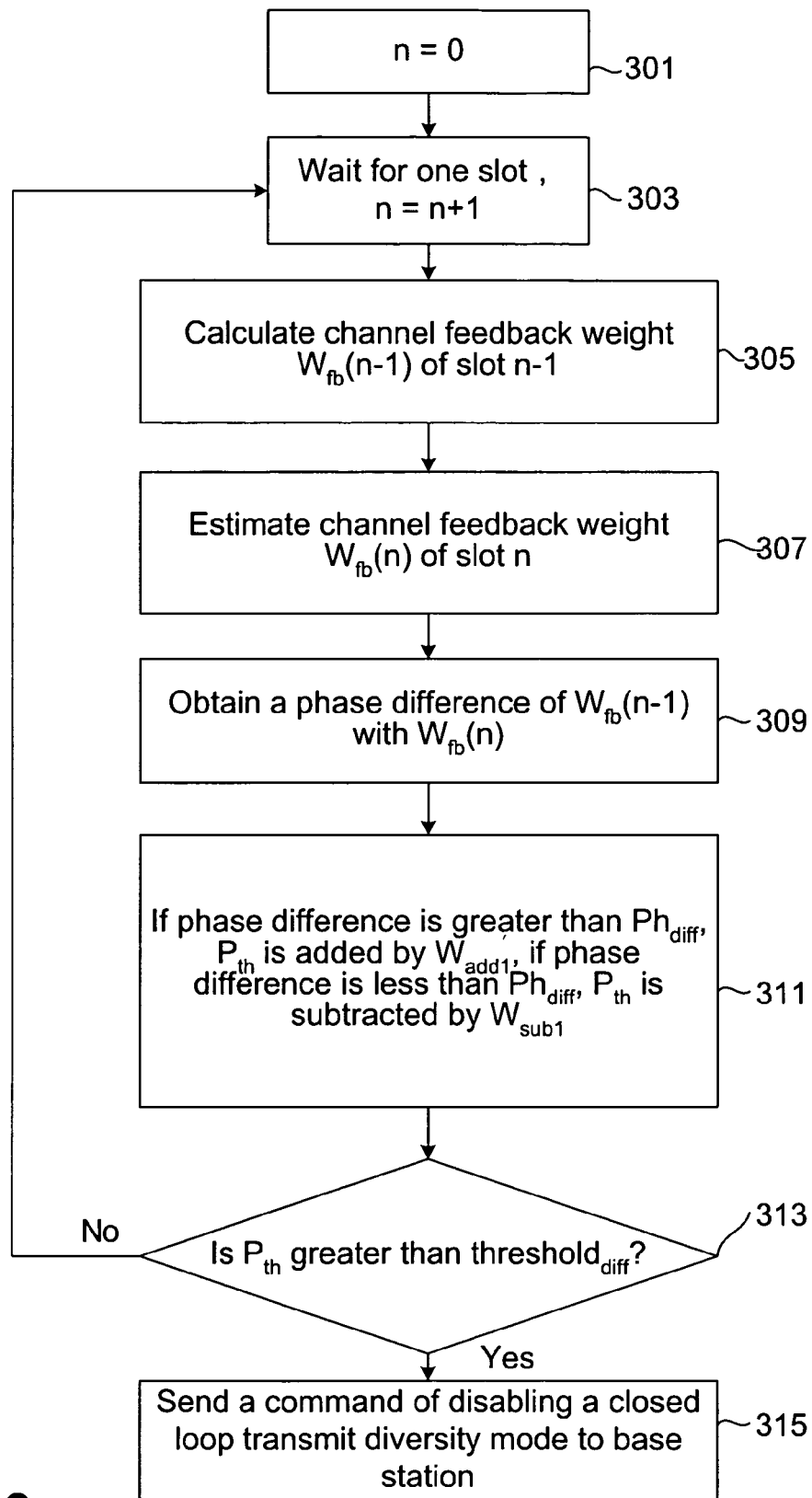
FIG. 3 shows a flowchart of the present invention (determination of channel variation)

FIG. 3 shows a flow chart of the present invention. In closed loop transmit diversity mode, information about the channel is fed back to base station and utilized to provide diversity as well as antenna gain at low mobile velocities under flat fading condition. We can know that the performance, however, drops at higher velocities. The main reason for this loss in the performance is the delay associated with the periodic feedback. When the mobile unit suffers from rapidly fading channel, the performance would degrade in closed loop transmit diversity mode. Here we provide a method to determine whether mobile unit incur fast channel variation and its state flow shown in FIG. 3. Before introducing the state flow of channel variation detection in FIG. 3. There are some important parameters need to define and explain:

$Ph_{diff}$: A first predetermined value, $Ph_{diff}$ is threshold defined for comparing with the phase difference.

$P_{th}$: A weighting defined for recording the channel variation status.

$w_{add\ 1}$: A value defined for add with $P_{th}$ upon the decision.

$W_{sub\ 1}$: A value defined for subtract with $P_{th}$ upon the decision.

$threshold_{diff}$: A second predetermined value, $threshold_{diff}$ is threshold to determine turn off close loop transmitting diversity mode.

FIG. 3 describe steps of this invention, in step 303: estimate the channel impulse from CPICH every one slot;, step 305: we calculate the channel feedback weights $w_{fb}(n-1)$ of the previous slot n−1, and in step 307: we estimate the channel feedback weights $w_{fb}(n)$ of the current slot n; obtain the phase difference of $w_{fb}(n)$ and $w_{fb}(n-1)$ in step 309; If the phase difference larger than predetermined value $Ph_{diff}$, we will add $P_{th}$ by $w_{add1}$ and record it. Otherwise, if the phase difference less than $Ph_{diff}$, we will subtract $P_{th}$ by $w_{sub1}$ and record it, in step 311. In step 313, if the $P_{th}$ larger than the predefined threshold $threshold_{diff}$, i.e. the channel variation is fast. The mobile unit shall send a command for feedback an indication to base station to ask for stopping CLTD (Close Loop Transmit Diversity) mode, in step 315.

Furthermore, the base station uses the eigenvector fed back from the mobile unit to determine the feedback weight. If the feedback weight in the high moving speed environment is incorrect, the closed loop transmit diversity may decrease the system efficiency. Therefore, the present invention also determines the data transmit diversity mode of the base station by observing the feedback error rate.

In closed loop transmit diversity mode, information about the channel is fed back to base station. But how can we make sure the feedback information is fed back to BS correctly? If there are feedback error, the performance would degrade in closed loop transmit diversity mode. Here we provide a method to determine whether the feedback error rate is high and its state flow shown in FIG. 4. For determining the feedback error, we need the pilot symbols of DPCH for auxiliary. In FIG. 1, we can know that the feedback channel weights would multiply with DPCH. So, we can also estimate the channel weights from pilot symbols of DPCH to see the feedback weights whether fed back BS correctly. If there are no feedback errors, suppose that the phase difference of CPICH and pilot symbol should very similar.

Before introducing the state flow of determination of feedback error, we have to define some important parameters:

$W_{tune}(n)$: The estimation of the tuned diversity weight.

$Ph_{error}$: A first predetermined value, $Ph_{error}$ is threshold defined for comparing with the feedback error.

$FBI_{th}$: a weighting for recording the feedback information error $W_{add\ 2}$: A value defined for add with $FBI_{th}$ upon the decision.

$W_{sub\ 2}$: A value defined for subtract with $FBI_{th}$ upon the decision.

$threshold_{error}$: A second predetermined value, $threshold_{error}$ is threshold to determine turn off close loop transmit diversity.

Figure 4:
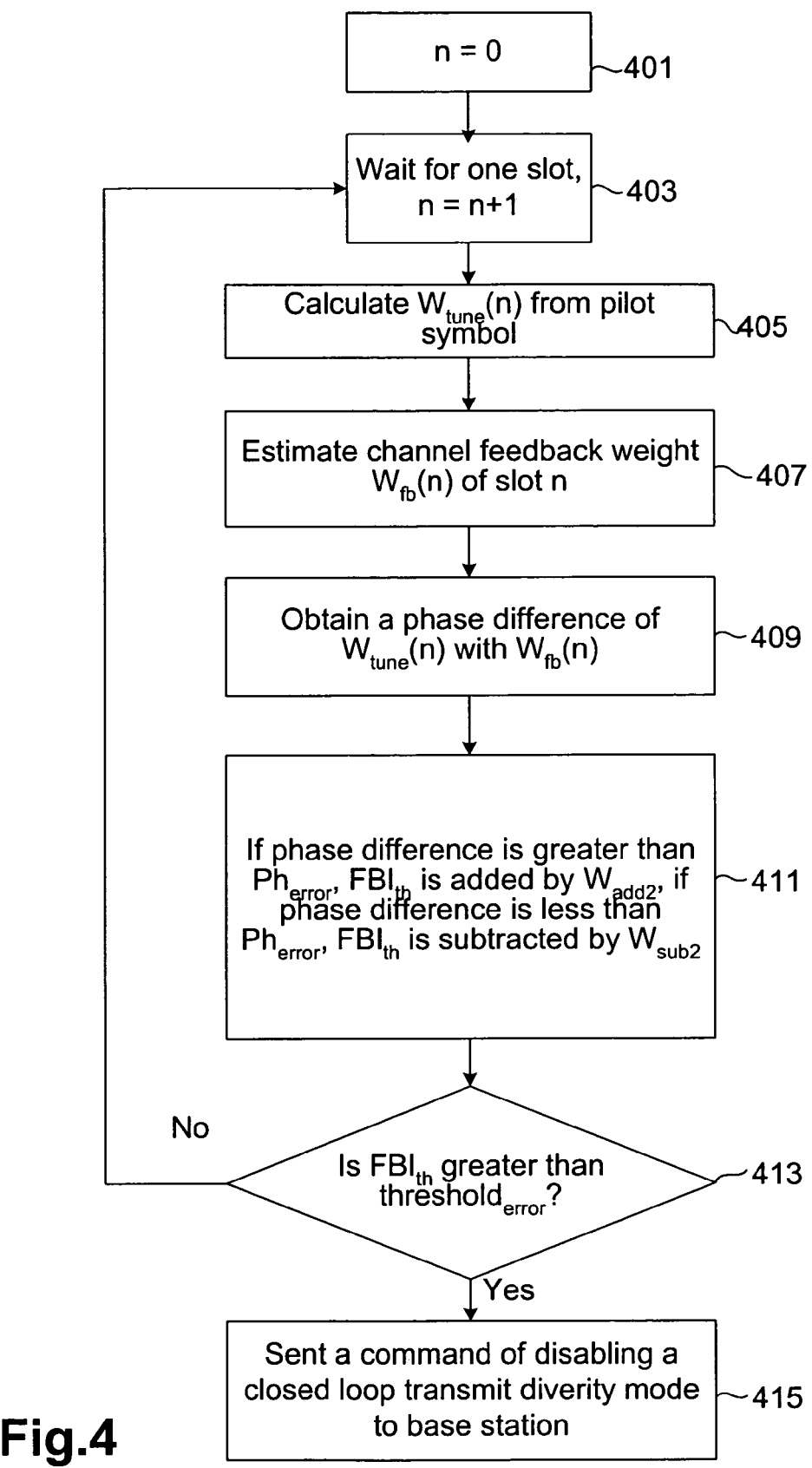
FIG. 4 shows a flowchart of the present invention(determination of FBI error)

We would estimate the channel impulse from CPICH every one slot. In FIG. 4, in step 405, we calculate the channel weight from CPICH and pilot symbol of DPCH in current time slot and record it as $w_{tune}(n)$; in step 407, we also estimate the channel feedback weight $w_{fb}(n)$ from pilot symbol of DPCH in current time slot; Then, in step 409, compare the phase difference of $w_{tune}(n)$ and $w_{fb}(n)$ to check the feedback error. We can know that if the phase difference is large, the feedback error must occur. So, we define the following rule to record feedback error. In step 411, if the phase difference larger than $Ph_{error}$, we will add $FBI_{th}$ by $w_{add\ 2}$ and record it. Otherwise, if the phase difference small than $Ph_{error}$, we will subtract $FBI_{th}$ by $w_{sub\ 2}$ and record it. In step 413, if the $FBI_{th}$ larger than the predefined threshold $threshold_{error}$, i.e. the feedback error is high. In step 415, the mobile unit shall send a command for feedback an indication to BS to ask for stopping close loop transmit diversity.

Figure 5:
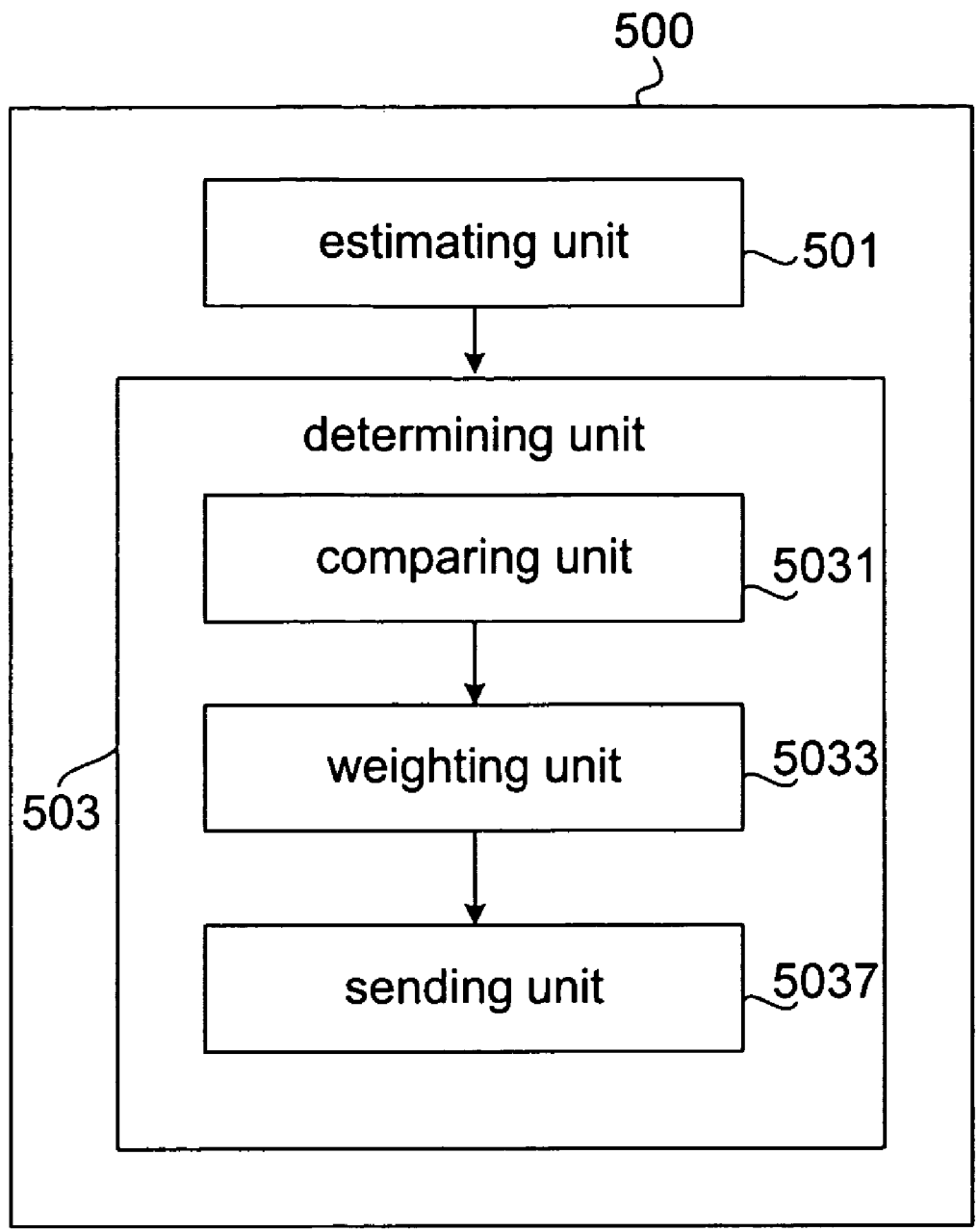
FIG. 5 shows an apparatus of the present invention.

The present invention also provides an apparatus for a mobile unit to determine a data transmit diversity mode of a base station in a wireless communication system. As shown in FIG. 5, the apparatus 500 includes an estimating unit 501 and a determining unit 503. The estimating unit 501 estimates the phase of a first channel feedback weight of the mobile unit during the previous slot. The estimating unit 501 further estimates the phase of a second feedback weight of the mobile unit during current slot. The determining unit 503 determines the data transmit diversity mode of the base station according to the phase difference between the first channel feedback weight and the second channel feedback weight.

The determining unit 503 further includes a comparing unit 5031, a weight unit 5033 and a sending unit 5037. The comparing unit 5031 obtain a phase difference of the first channel feedback weight and the second channel feedback phase. The weight unit 5033 adds $W_{add\ 1}$ value to $P_{th}$ if the phase difference is greater than a first predetermined value $P_{diff}$, and subtracts $W_{sub\ 1}$ from $P_{th}$ if the phase difference is less than the first predetermined value $P_{diff}$. The sending unit 5037 sends a command of disabling a closed loop transmit diversity mode to the base station if the $P_{th}$ is greater than a second predetermined value threshold$_{diff}$.

Figure 6:
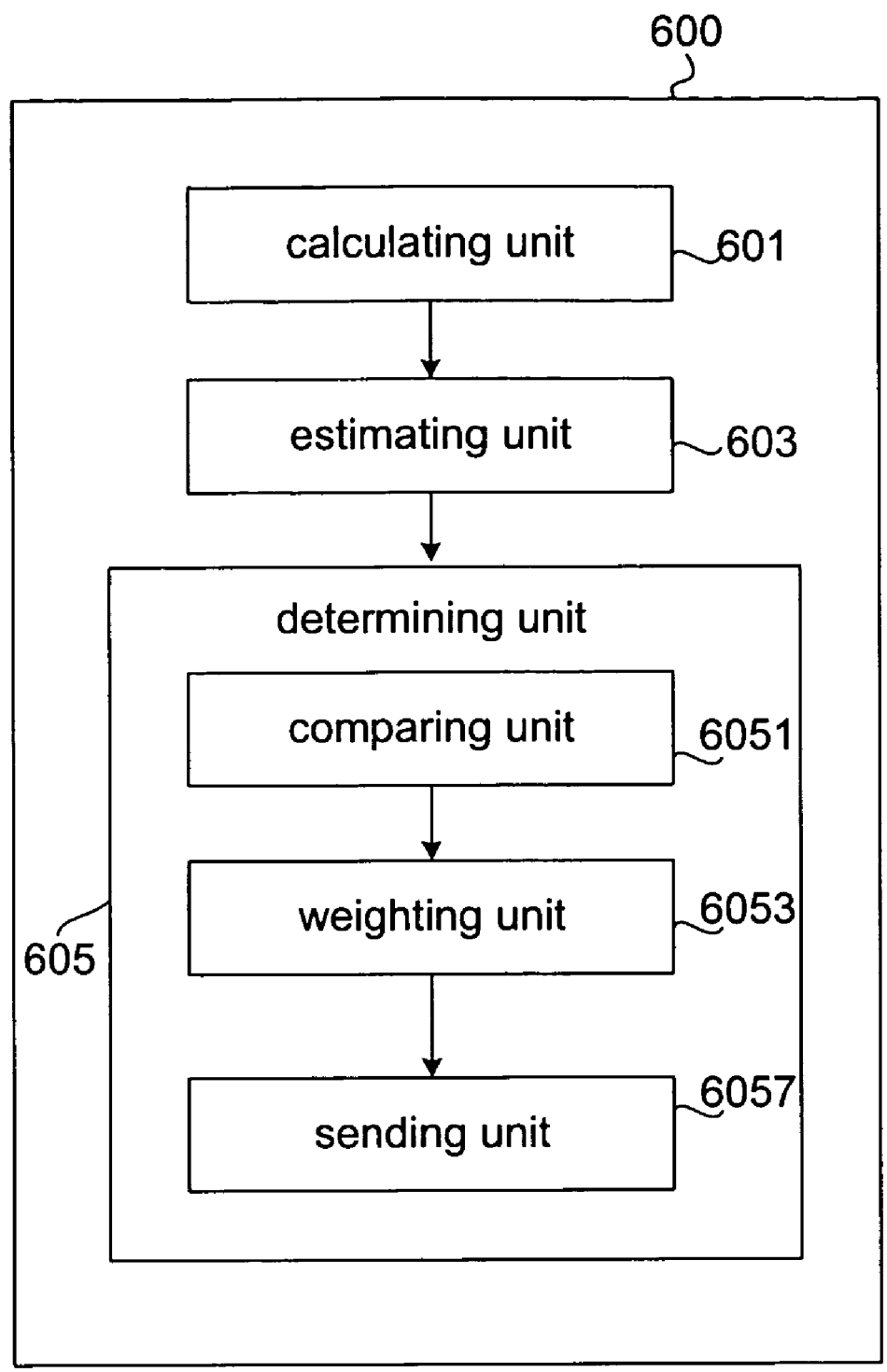
FIG. 6 shows another apparatus of the present invention.

In addition, the present invention provides another apparatus for a mobile unit to determine a data transmit diversity mode of a base station in a wireless communication system. As shown in FIG. 6, the apparatus 600 includes a calculating unit 601, an estimating unit 603 and a determining unit 605. The calculating unit 601 calculates a tune weight of the mobile unit corresponding to a signal received from the base station during current time slot. The tune weight has a tune phase. The tune weight is a difference of a channel signal from a common pilot channel and a pilot symbol of a dedicated physical channel of said base station. The estimating unit 603 estimates a channel feedback weight of the mobile unit during current time slot. The feedback weight has a feedback phase. The determining unit 605 determines the data transmit diversity mode of the base station according to the tune weight and the feedback weight.

The determining unit 605 further includes a comparing unit 6051, a weight unit 6053 and a sending unit 6057. The comparing unit 6051 compares the phase difference of the tune weight and the channel feedback weight. The weight unit 6053 adds $W_{add\ 2}$ to $FBI_{th}$ if the phase difference is greater than a first predetermined value $Ph_{error}$, and subtracts $W_{sub\ 2}$ from the determining value $FBI_{th}$ if the phase difference is less than the first predetermined value $Ph_{error}$. The sending unit 6057 sends a command of disabling a closed loop transmit diversity mode to the base station if the determining value $FBI_{th}$ is greater than a second predetermined value threshold$_{error}$.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

The invention claimed is:

1. A method for a mobile unit determining a data transmit diversity mode of a base station in a wireless communication system, comprising:
    (a) estimating a first channel feedback weight of said mobile unit during a first time slot, said first channel feedback weight having a first feedback phase;
    (b) estimating a second channel feedback weight of said mobile unit during a second time slot, said second channel feedback weight having a second feedback phase; and
    (c) determining said data transmit diversity mode of said base station according to said first feedback phase and said second feedback phase, and sending a command of disabling a closed loop transmit diversity mode to said base station when it is determined that the closed loop transmit diversity mode is to be disabled.

2. The method of claim 1, step (c) further comprising:
    (d) obtaining a phase difference of said first feedback phase and said second feedback phase; and
    (e) determining said data transmit diversity mode of said base station according to said phase difference.

3. The method of claim 2, step (e) further comprising:
    (f) adding a first value to a determining value if said phase difference is greater than a first predetermined value, and subtracting said determining value by a second value if said phase difference is less than said first predetermined value; and
    (g) determining to stop the closed loop transmit diversity if said determining value is greater than a second predetermined value.

4. The method of claim 3, said first value being equal to said second value.

5. A method for a mobile unit determining a data transmit diversity mode of a base station in a wireless communication system, comprising:
    (a) calculating a tune weight of said mobile unit corresponding to a signal received from said base station during a current time slot, said tune weight having a tune phase;
    (b) estimating a feedback weight of said mobile unit during said current time slot, said feedback weight having a feedback phase; and
    (c) determining said data transmit diversity mode of said base station according to said tune weight and said feedback weight, and sending a command of disabling a closed loop transmit diversity mode to said base station when it is determined that the closed loop transmit diversity mode is to be disabled.

6. The method of claim 5, wherein said tune weight of step (a) is a difference of a channel signal from a common pilot channel and a pilot symbol of a dedicated physical channel of said base station.

7. The method of claim 5, step (c) further comprising:
    (d) obtaining a phase difference of said tune phase and said feedback phase; and
    (e) determining said data transmit diversity mode of said base station according to said phase difference.

8. The method of claim 7, step (e) further comprising:
    (f) adding a first value to a determining value if said phase difference is greater than a first predetermined value, and subtracting said determining value by a second value if said phase difference is less than said first predetermined value; and
    (g) determining to stop the closed loop transmit diversity if said determining value is greater than a second predetermined value.

9. The method of claim 8, said first value being equal to said second value.

10. An apparatus for a mobile unit determining a data transmit diversity mode of a base station in a wireless communication system, comprising:
    an estimating unit for estimating a first channel feedback weight of said mobile unit during a first time slot, said first feedback weight having a first feedback phase, and for estimating a second feedback weight of said mobile unit during a second time slot, said second feedback weight having a second feedback phase;

a determining unit for determining said data transmit diversity mode of said base station according to said first feedback phase and said second feedback phase; and a sending unit for sending a command of disabling a closed loop transmit diversity mode to said base station.

11. The apparatus of claim 10, said determining unit further comprising:

a comparing unit for obtaining a phase difference of said first feedback phase and said second feedback phase; and a weight unit for adding a first value to a determining value if said phase difference is greater than a first predetermined value, and subtracting said determining value by a second value if said phase difference is less than said first predetermined value, wherein said sending unit sending the command of disabling the closed loop transmit diversity mode to said base station if said determining value is greater than a second predetermined value.

12. An apparatus for a mobile unit determining a data transmit diversity mode of a base station in a wireless communication system, comprising:

a calculating unit for calculating a tune weight of said mobile unit corresponding to a signal received from said base station during a current time slot, said tune weight having a tune phase;

an estimating unit for estimating a feedback weight of said mobile unit during said current time slot, said feedback weight having a feedback phase;

a determining unit for determining said data transmit diversity mode of said base station according to said tune weight and said feedback weight; and a sending unit for sending a command of disabling a closed loop transmit diversity mode to said base station.

13. The method of claim 12, wherein said tune weight is a difference of a channel signal from a common pilot channel and a pilot symbol of a dedicated physical channel of said base station.

14. The apparatus of claim 12, said determining unit further comprising:

a comparing unit for obtaining a phase difference of said tune phase and said feedback phase; and a weight unit for adding a first value to a determining value if said phase difference is greater than a first predetermined value, and subtracting said determining value by a second value if said phase difference is less than said first predetermined value;

wherein the sending unit sending the command of disabling the closed loop transmit diversity mode to said base station if said determining value is greater than a second predetermined value.

* * * * *